United States Patent
Wang et al.

(10) Patent No.: US 12,186,704 B2
(45) Date of Patent: Jan. 7, 2025

(54) CARBON DIOXIDE FIXATION METHOD

(71) Applicants: TAIHEIYO CEMENT CORPORATION, Tokyo (JP); THE UNIVERSITY OF TOKYO, Tokyo (JP)

(72) Inventors: Dianchao Wang, Tokyo (JP); Takafumi Noguchi, Tokyo (JP); Takahito Nozaki, Chiba (JP); Yasuhide Higo, Chiba (JP)

(73) Assignees: TAIHEIYO CEMENT CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 192 days.

(21) Appl. No.: 17/429,966

(22) PCT Filed: Dec. 2, 2019

(86) PCT No.: PCT/JP2019/047023
§ 371 (c)(1),
(2) Date: Aug. 11, 2021

(87) PCT Pub. No.: WO2020/166174
PCT Pub. Date: Aug. 20, 2020

(65) Prior Publication Data
US 2022/0126237 A1    Apr. 28, 2022

(30) Foreign Application Priority Data

Feb. 14, 2019 (JP) .................................. 2019-024659

(51) Int. Cl.
| | | |
|---|---|---|
| *B01D 53/62* | (2006.01) | |
| *B01D 53/14* | (2006.01) | |
| *B01D 53/81* | (2006.01) | |

(52) U.S. Cl.
CPC ......... *B01D 53/62* (2013.01); *B01D 53/1475* (2013.01); *B01D 53/81* (2013.01); *B01D 2257/504* (2013.01); *B01D 2258/0233* (2013.01)

(58) Field of Classification Search
CPC .... B01D 53/62; B01D 53/1475; B01D 53/81; B01D 2257/504; B01D 2258/0233
USPC ...................................................... 502/427
See application file for complete search history.

(56) References Cited

FOREIGN PATENT DOCUMENTS

| | | |
|---|---|---|
| JP | H5-184864 A | 7/1993 |
| JP | H5-212278 A | 8/1993 |
| JP | H5-238790 A | 9/1993 |
| JP | H7-88362 A | 4/1995 |
| JP | H9-59050 A | 3/1997 |
| JP | H11-192416 A | 7/1999 |
| JP | H11-319765 A | 11/1999 |
| JP | 2000-197810 A | 7/2000 |
| JP | 2008-75391 A | 4/2008 |
| JP | 2009-28581 A | 2/2009 |
| JP | 2009-90198 A | 4/2009 |
| JP | 2014-117636 A | 6/2014 |
| JP | 2018-58002 A | 4/2018 |

OTHER PUBLICATIONS

JPH 0959050 A—English translation (Year: 1997).*
Materic et al., "High Temperature Carbonation of Ca(OH)2", Industrial & Engineering Chemistry Research, 2011, 50, 5927-5932. (Year: 2011).*
Kaliyavaradhan et al., "Potential of CO2 sequestration through construction and demolition (C & D) waste—An overview", Journal of CO2 Utilization 20 (2017) 234-242. (Year: 2017).*
International Search Report of the International Searching Authority mailed Feb. 4, 2020 for the corresponding International application No. PCT/JP2019/047023 (and English translation).
Written Opinion of the International Searching Authority mailed Feb. 4, 2020 for the corresponding international application No. PCT/JP2019/047023.
Extended European Search Report dated Sep. 27, 2022 issued in corresponding European Patent Application No. 19915109.3.
Office Action dated Nov. 23, 2022 issued in corresponding Indian Patent Application No. 202147040473 (and English translation).

* cited by examiner

*Primary Examiner* — Anita Nassiri-Motlagh
(74) *Attorney, Agent, or Firm* — Posz Law Group, PLC

(57) ABSTRACT

Provided is a simple and low-cost method for efficiently fixing a sufficient amount of carbon dioxide contained in a carbon dioxide-containing gas (e.g. a plant exhaust gas). The method of fixing carbon dioxide comprises a contact step of bringing a carbon dioxide-containing gas having a temperature of 350° C. or more into contact with a cementitious hardened body to fix carbon dioxide in the carbon dioxide-containing gas to the cementitious hardened body. The carbon dioxide-containing gas may be a gas that is free from being supplied with moisture before the contact step and during the contact step. One of examples of the carbon dioxide-containing gas is a plant exhaust gas.

5 Claims, No Drawings

CARBON DIOXIDE FIXATION METHOD

CROSS REFERENCE TO RELATED APPLICATIONS

This application is a U.S. national stage application of International Patent Application No. PCT/JP2019/047023 filed on Dec. 2, 2019, which claims priority to Japanese Patent Application No. 2019-024659 filed on Feb. 14, 2019 the disclosures of which are incorporated herein by reference.

TECHNICAL FIELD

The present invention relates to a method of fixing carbon dioxide in a carbon dioxide-containing gas (e.g., a plant exhaust gas).

BACKGROUND ART

There have been known various technologies for reducing carbon dioxide emissions into the atmosphere through the fixation of carbon dioxide in an exhaust gas.

For example, Patent Literature 1 describes a method of reducing carbon dioxide gas emissions, the method being characterized by including a step of bringing an exhaust gas containing $CO_2$ into contact with a bulk material of solid particles each containing CaO and/or $Ca(OH)_2$ as its component to fix the $CO_2$ in the exhaust gas as $CaCO_3$ to the solid particles, thereby reducing a $CO_2$ concentration in the exhaust gas. According to the method, the $CO_2$ in the exhaust gas produced in an industrial process or the like is efficiently absorbed and removed, and hence $CO_2$ emissions into the atmosphere can be reduced.

Patent Literature 2 describes a method of fixing carbon dioxide, the method being characterized by including the steps of: accumulating materials obtained by crushing waste concrete; supplying moisture to the accumulated material, followed by stirring to bring the material into a wet state; supplying an exhaust gas involving exhaust heat to the material in a wet state to dry the material; and repeating the above-mentioned steps of the moisture supply and the material stirring, and the exhaust gas supply again to fix carbon dioxide in the exhaust gas into the material. According to the method, the fixation of the carbon dioxide in the exhaust gas involving the exhaust heat can be achieved early with the recycled sand of the waste concrete.

Patent Literature 3 describes a carbon dioxide-fixing concrete structure that is obtained by forming a hardened body of a concrete composition, which contains water, cement, admixtures and aggregates, on a surface of a concrete structure. The carbon dioxide-fixing concrete structure has a carbon dioxide-fixing molded body that has a surface layer part having voids and that can fix carbon dioxide in the atmosphere by the surface layer part. According to the carbon dioxide-fixing concrete structure, the carbon dioxide in the atmosphere can be effectively fixed.

CITATION LIST

Patent Literature

[Patent Literature 1] JP 2000-197810 A
[Patent Literature 2] JP 2009-90198 A
[Patent Literature 3] JP 2008-75391 A

SUMMARY OF INVENTION

Technical Problem

An object of the present invention is to provide a method by which a sufficient amount of carbon dioxide in a carbon dioxide-containing gas (e.g., a plant exhaust gas) can be fixed easily, at low cost, and efficiently.

Solution to Problem

The inventors of the present invention have made extensive investigations to solving the above-mentioned problem, and as a result, have found that in the case where a gas having a temperature of 350° C. or more is used as a carbon dioxide-containing gas when the carbon dioxide-containing gas is brought into contact with a cementitious hardened body, a sufficient amount of carbon dioxide in the carbon dioxide-containing gas can be efficiently fixed to the cementitious hardened body as compared to, for example, the case where a gas having a temperature of 300° C. is used. Thus, the inventors have completed the present invention.

The present invention provides the following items [1] to [5].

[1] A method of fixing carbon dioxide, including a contact step of bringing a carbon dioxide-containing gas having a temperature of 350° C. or more into contact with a cementitious hardened body to fix carbon dioxide in the carbon dioxide-containing gas to the cementitious hardened body.
[2] The method of fixing carbon dioxide according to the above-mentioned item [1], wherein moisture is not supplied to the carbon dioxide-containing gas (i.e. the carbon dioxide-containing gas is free from being supplied with moisture) before the contact step and during the contact step.
[3] The method of fixing carbon dioxide according to the above-mentioned item [1] or [2], wherein the carbon dioxide-containing gas contains carbon dioxide gas at a ratio of 5% or more as a volume fraction value (i.e. the carbon dioxide-containing gas contains 5% or more of carbon dioxide gas in terms of volume fraction value).
[4] The method of fixing carbon dioxide according to any one of the above-mentioned items [1] to [3], wherein the carbon dioxide-containing gas is a plant exhaust gas.
[5] The method of fixing carbon dioxide according to any one of the above-mentioned items [1] to [4], wherein the cementitious hardened body is a recycled aggregate, a waste material of a building material formed of concrete or mortar, a waste material of a cement paste hardened body, or sludge produced in using ready-mixed concrete.

Advantageous Effects of Invention

In the method of the present invention, a gas having a temperature of 350° C. or more is used as a carbon dioxide-containing gas (e.g., a plant exhaust gas) that is brought into contact with a cementitious hardened body. Accordingly, larger amount of the carbon dioxide in the carbon dioxide-containing gas can be more efficiently fixed to the cementitious hardened body as compared to, for example, the case where a gas having a temperature of 300° C. is used. In addition, the fixation of the carbon dioxide can significantly reduce carbon dioxide emissions into the atmosphere.

In addition, according to the method of the present invention, a sufficient amount of the carbon dioxide in the carbon dioxide-containing gas can be efficiently fixed to the cementitious hardened body without an operation of supplying a moisture (i.e. water) to the carbon dioxide-containing gas. In general, an operation of supplying a moisture to a carbon dioxide-containing gas before or during a contact with a cementitious hardened body means that a moisture content (i.e. a water ratio) in the carbon dioxide-containing gas increases, thereby accelerating the fixation of the carbon dioxide to the cementitious hardened body. In the present invention, there is no need to arrange means for supplying a moisture to the carbon dioxide-containing gas, and hence the method of the present invention can be performed at low cost.

DESCRIPTION OF EMBODIMENTS

A method of fixing carbon dioxide of the present invention includes a contact step of bringing a carbon dioxide-containing gas having a temperature of 350° C. or more into contact with a cementitious hardened body to fix carbon dioxide in the carbon dioxide-containing gas to the cementitious hardened body.

Herein, the term of "cementitious hardened body" means a product obtained by the hardening of a composition containing cement and water. More specifically, the term of "cementitious hardened body" means any one of a hardened body formed of concrete, a hardened body formed of mortar, and a hardened body formed of a cement paste.

In addition, the term of "cementitious hardened body" as used herein encompasses a hardened body that is semi-hardened (in other words, a hardened body whose hardening is in progress) as well as a hardened body that is completely hardened.

A recycled cementitious hardened body is preferably used as the cementitious hardened body used in the present invention from the viewpoint of accelerating the utilization of wastes.

Examples of the recycled cementitious hardened body include a recycled aggregate, a waste material of a building material formed of concrete or mortar, a waste material of a cement paste hardened body, and sludge produced in production of ready-mixed concrete (i.e. sludge that is completely hardened or sludge that is in a semi-hardened state after dehydration treatment).

The cementitious hardened body preferably has the form of grain (i.e. the form of a hardened body having a size measured in millimeters) for enlarging the area of its contact with the carbon dioxide-containing gas to increase the amount of the carbon dioxide to be fixed.

The grain size of the cementitious hardened body is preferably 50 mm or less, more preferably 40 mm or less, still more preferably 30 mm or less, still more preferably 20 mm or less, particularly preferably 10 mm or less. Herein, the grain size refers to the maximum size of the grain (e.g., when a section of the grain is an elliptical shape, the size of its major axis).

Herein, the carbon dioxide-containing gas means a gas containing a carbon dioxide gas (i.e. $CO_2$ that is a gas).

An example of the carbon dioxide-containing gas is a plant exhaust gas (i.e. a gas emitted from a factory).

Examples of the plant exhaust gas include an exhaust gas of a cement plant, an exhaust gas of a coal-fired power plant, and an exhaust gas produced by exhaust treatment in a painting plant.

A highly purified gas obtained by separation and recovery from a plant exhaust gas may be used as the plant exhaust gas in addition to the above-mentioned examples.

The ratio of the carbon dioxide gas in the carbon dioxide-containing gas is preferably 5% or more, more preferably 6% or more, particularly preferably 7% or more as a volume fraction value. The reason of the ratio being preferably 5% or more is that the amount of the carbon dioxide to be fixed increases, and hence a reducing effect on carbon dioxide emissions into the atmosphere becomes larger.

Although a moisture content in the carbon dioxide-containing gas to be used in the present invention is not particularly limited, the moisture content is preferably 2% or less, more preferably 1% or less, particularly preferably 0.5% or less as the value of a moisture content measured by a method described in "7 Measurement of Moisture Content in Flue Gas" of "JIS Z 8808:2013 Methods of measuring Dust Concentration in Flue Gas" from the viewpoint of such effect of the present invention that even when the moisture content in the carbon dioxide-containing gas is not increased for carbonation, the carbonation ratio of the cementitious hardened body can be increased merely by adjusting the temperature of the carbon dioxide-containing gas to 350° C. or more as compared to, for example, the case where the temperature is set to 300° C. (in particular, from the viewpoint of the fact that no moisture-supplying means is required).

The moisture content means the ratio of water vapor in the carbon dioxide-containing gas as a volume fraction (unit: %).

In the present invention, the carbon dioxide-containing gas satisfies a condition that its temperature is 350° C. or more.

The temperature is preferably 400° C. or more, more preferably 450° C. or more, particularly preferably 500° C. or more from the viewpoint of accelerating the fixation of the carbon dioxide.

The temperature is preferably 1,500° C. or less, more preferably 1,200° C. or less, particularly preferably 900° C. or less from the viewpoint of the difficultly of obtaining a carbon dioxide-containing gas having an extremely high temperature.

One of preferred examples of the carbon dioxide-containing gas to be used in the present invention is a gas containing water vapor, a carbon dioxide gas, and an inert gas.

Examples of the inert gas include a nitrogen gas and an argon gas.

The ratio of the inert gas in the carbon dioxide-containing gas is preferably 5% or more, more preferably 10% or more, still more preferably 15% or more, particularly preferably 20% or more as a volume fraction value. The reason of the ratio being preferably 5% or more is that, for example, such carbon dioxide-containing gas is easily available.

Examples of other components (i.e. components except water vapor, carbon dioxide gas, and inert gas) of the carbon dioxide-containing gas to be used in the present invention include carbon monoxide, hydrocarbons, nitrogen oxides, and sulfur oxides. These examples are typically present in a plant exhaust gas or the like.

The ratio of other components in the carbon dioxide-containing gas is preferably 30% or less, more preferably 20% or less, still more preferably 10% or less, particularly preferably 5% or less as a volume fraction value. The reason of the ratio being preferably 30% or less is that, for example, such carbon dioxide-containing gas is easily available.

EXAMPLES

The present invention is described below by way of Examples. However, the present invention is not limited to Examples, and may adopt various embodiments as long as the embodiments are included in the scope of claims.

Example 1

(1) Production of Specimen Formed of Cementitious Hardened Body

100 Parts by mass of high-early-strength Portland cement and 70 parts by mass of water were mixed to provide a cement paste. After that, the cement paste was filled into a mold, and was cured in a sealed vessel filled with water for 50 days. Thus, a cement paste hardened body (size: 10 mm×10 mm×2 mm) that was a specimen was produced.

(2) Contact with Carbon Dioxide-Containing Gas

The produced specimen (i.e. cement paste hardened body) was mounted on an alumina boat in a tubular electric furnace (product number: KTF433, manufacturer: Koyo Thermo Systems Co., Ltd.). After that, a carbon dioxide-containing gas having composition shown in Table 1 was supplied into the tubular electric furnace, and the specimen was subjected to heating treatment by being brought into contact with the carbon dioxide-containing gas under a temperature atmosphere at 500° C. for 60 minutes.

Gases to which no moisture was supplied were used as carbon dioxide-containing gases in Examples 1 and 2, and Comparative Example 1. No means for supplying moisture was arranged in the tubular electric furnace.

The values in the column "Composition of carbon dioxide-containing gas (%)" in Table 1 represents a volume fraction (t). The values in the column "Water vapor" in Table 1 represents a moisture content (%) measured by a method described in "7 Measurement of Moisture Content in Flue Gas" of "JIS Z 8808:2013 Methods of measuring Dust Concentration in Flue Gas."

(3) Calculation of Carbonation Ratio

The ratio (unit: mass %) of calcium carbonate in the specimen (i.e. cement paste hardened body) after the heating treatment in the above-mentioned (2) was determined from a mass reduction in the range of from 480° C. to 800° C. with a thermogravimetric differential thermal analyzer (TG-DTA).

Herein, the ratio (unit: mass %) of calcium carbonate means the ratio of the mass of calcium carbonate to the mass of the specimen after the measurement of the mass reduction with the TG-DTA (provided that the measurement is performed while the specimen is heated until its temperature reaches 1,000° C.) (in other words, [mass of calcium carbonate]×100/[mass of specimen]; unit: %).

The mass reduction in the range of from 480° C. to 800° C. measured with the TG-DTA means that the calcium carbonate in the specimen (i.e. cement paste hardened body) underwent decarbonation (in other words, the $CaCO_3$ changed into CaO). The amount of calcium carbonate ($CaCO_3$) before the decarbonation can be calculated on the basis of the mass reduction (i.e. $CO_2$ amount).

Meanwhile, when main minerals (i.e. alite, belite, $C_3A$, and $C_4AF$) in unhydrated cement are completely carbonated, the ratio of the mass of calcium carbonate to 100 mass % of the unhydrated cement (hereinafter sometimes referred to as "theoretical mass ratio of calcium carbonate") is theoretically calculated to be 113 mass %.

Herein, the theoretical mass ratio of calcium carbonate is represented by the following equation.

Theoretical mass ratio (%) of calcium carbonate="mass of calcium carbonate in case where main minerals (i.e. alite, belite, $C_3A$, and $C_4AF$) in unhydrated cement are completely carbonated"×100/"mass of unhydrated cement"

$C_3A$ in the equation means an aluminate phase (i.e. $3CaO \cdot Al_2O_3$). $C_4AF$ in the equation means a ferrite phase (i.e. $4CaO \cdot Al_2O_3 \cdot Fe_2O_3$).

Accordingly, the carbonation ratio (%) of the specimen can be calculated from the following equation.

Carbonation ratio (%)=[ratio (%) of mass of calcium carbonate to mass of specimen after measurement of mass reduction with TG-DTA (provided that the measurement is performed while specimen is heated until its temperature reaches 1,000° C.)]×100/[theoretical mass ratio of calcium carbonate (i.e. 113%)]

The carbonation ratio calculated by using the equation is shown in Table 1.

Examples 2 to 4 and Comparative Example 1

Experiments were each performed in the same manner as in Example 1 except that the temperature in the tubular electric furnace and the composition of the carbon dioxide-containing gas were changed as shown in Table 1.

In each of Examples 3 and 4, a gas whose moisture content (see the column "Water vapor" in Table 1) had been increased as shown in Table 1 by moisture supply was used as a carbon dioxide-containing gas.

The foregoing results are shown in Table 1.

TABLE 1

| | Moisture supply | Temperature (° C.) | Composition of carbon dioxide-containing gas (%) | | | Carbonation ratio (%) 60 Minutes |
| --- | --- | --- | --- | --- | --- | --- |
| | | | Carbon dioxide gas | Nitrogen gas | Water vapor | |
| Example 1 | Absent | 500 | 25 | 75 | 0 | 12 |
| Example 2 | Absent | 400 | 25 | 75 | 0 | 6 |
| Comparative Example 1 | Absent | 300 | 25 | 75 | 0 | 1 |
| Example 3 | Present | 500 | 8 | 22 | 70 | 13 |
| Example 4 | Present | 400 | 9 | 28 | 63 | 5 |

It is found from Table 1 that in each of Examples 1 and 2, the temperature of the carbon dioxide-containing gas is 350° C. or more, and hence, as compared to Comparative Example 1, the value of the carbonation ratio is large, that is, a sufficient amount of the carbon dioxide is efficiently fixed. It is found that also in each of Examples 3 and 4, the temperature of the carbon dioxide-containing gas is 350° C. or more, and hence the value of the carbonation ratio is large, that is, a sufficient amount of the carbon dioxide is efficiently fixed.

In particular, it is found that in each of Examples 1 and 2, despite the fact that a gas to which no moisture was supplied was used as the carbon dioxide-containing gas (in other words, a gas that had not been subjected to the operation of increasing its moisture content through use of moisture-supplying means was used), the carbonation ratio is almost the same as those of Examples 3 and 4 (in each of Examples 3 and 4, a carbon dioxide-containing gas whose moisture content had been increased by the moisture supply was used).

The invention claimed is:

1. A method of fixing carbon dioxide, comprising a contact step of bringing a carbon dioxide-containing gas having a temperature of from 400° C. to 500° C. into contact with a cementitious hardened body to fix carbon dioxide in the carbon dioxide-containing gas to the cementitious hardened body, wherein moisture is not supplied to the carbon dioxide-containing gas before the contact step and during the contact step, during the contact step, the carbon dioxide-containing gas comprises a carbon dioxide gas at a ratio of 25% or more as a volume fraction value, and the cementitious hardened body has a form of grain having a grain size of 2 mm to 50 mm.

2. The method of fixing carbon dioxide according to claim 1, wherein the carbon dioxide-containing gas is a plant exhaust gas.

3. The method of fixing carbon dioxide according to claim 1, wherein the cementitious hardened body is a recycled aggregate, a waste material of a building material formed of concrete or mortar, a waste material of a cement paste hardened body, or sludge produced in using ready-mixed concrete.

4. The method of fixing carbon dioxide according to claim 1, wherein the carbon dioxide-containing gas has a ratio of water vapor of 0% as a volume fraction value.

5. The method of fixing carbon dioxide according to claim 1, wherein the cementitious hardened body has a carbonation ratio of from 6% to 12% after contacting the carbon dioxide-containing gas for 60 minutes.

* * * * *